United States Patent Office 2,747,857
Patented May 29, 1956

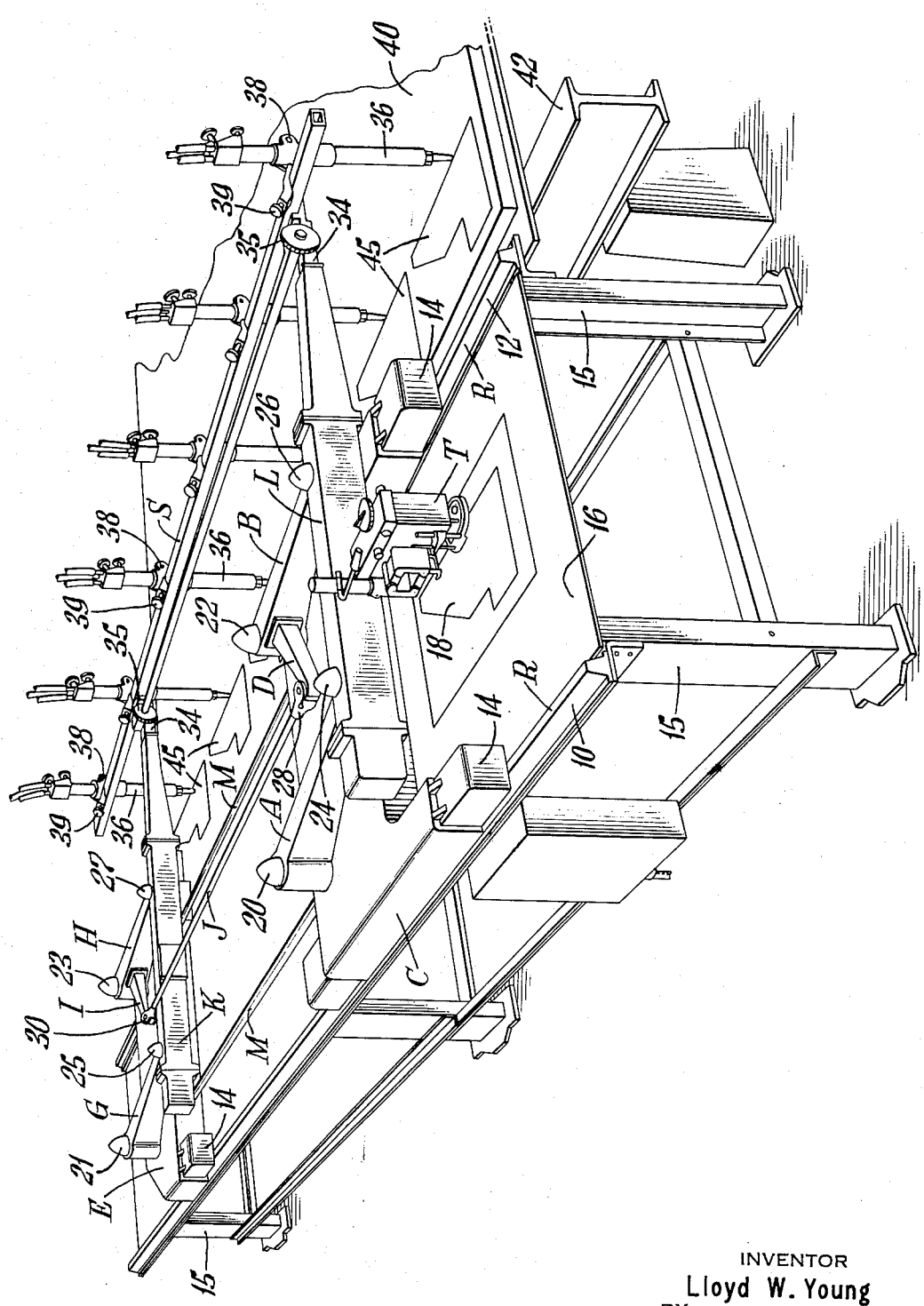

2,747,857
MULTIPLE BLOWPIPE SHAPE CUTTING MACHINE

Lloyd W. Young, Elizabeth, N. J., assignor to Union Carbide and Carbon Corporation, a corporation of New York Application January 7, 1955, Serial No. 480,440

2 Claims. (Cl. 266—23)

This invention relates to multiple blowpipe shape cutting machines, and more particularly to reproducing machines including a pattern or templet tracer mechanism, and comprising a carriage movable along a track and having a pair of parallel swinging arms pivoted thereon, the arms being connected by a transverse bar on which a tracer is mounted. Examples of these machines are shown in Krebs Patents Nos. 1,897,989 and 1,860,037.

This dual swinging arm type of machine is of general utility, and of sufficient versatility to handle about 90% of the shape cutting jobs occurring in the average steel fabrication mill, inasmuch as a scope of more than 36 inches in either length or breadth is seldom required. For these reasons, large numbers of these machines are in use as standard equipment in the majority of such mills.

However, inasmuch as the blowpipes or other reproducing tools are mounted on the transverse bar, the number of tools and the scope of the machine are limited. The trend in the steel fabricating industry has been toward cutting a number of identical parts simultaneously. Hence a large number of blowpipes is required. Although blowpipe mounting bars of abnormal length can be used on the old machines, there is a practical limit of such length beyond which blowpipe vibration and other complications develop, so that this expedient is unsatisfactory. The same is true when the shape to be cut exceeds a length of 36 inches in one direction.

It is therefore the main object of the present invention to provide an attachment to increase the scope of this type of machine and the number of reproducing tools which can be operated thereby without increasing the total cost to a prohibitive extent.

In view of the large number of these machines already in use, it is desirable to utilize the capital already invested, by extending the scope of the existing machines rather than a larger investment in entirely new design. It is therefore a more specific object to provide an attachment to support a longitudinal row of reproducing tools from the transverse bars carried by the dual swinging arms.

The attachment according to the present invention comprises a bell crank arm rigid with one of said parallel arms, a trailer movable along the tracks and having corresponding parallel arms and bell crank arm, a longitudinal link connecting said bell cranks, a transverse bar connecting said trailer arms, and a longitudinal tool supporting bar mounted on corresponding end portions of said transverse bars.

In the drawings:

The single figure is a perspective view of a parallel arm reproducing machine provided with the attachment according to the present invention.

The machine for which this attachment is provided comprises a carriage C movable along a track R and having a pair of parallel arms A and B pivoted thereon and connected by a transverse bar L, on which is mounted a tracer T.

The attachment according to the present invention comprises a bell crank arm D rigid with the arm B, and a trailer E connected to the carriage C by tie rods M and movable along the track R. The trailer E has corresponding parallel swinging arms G and H pivoted thereon, the arm H having a bell crank arm I. A longitudinal link J connects the bell crank arms D and I, a transverse bar K connects the trailer arms G and H, and a longitudinal tool supporting bar S is mounted on corresponding ends of the transverse bars L and K.

From the foregoing it will be apparent that the longitudinal travel of the carriage C is imparted to the trailer E by the longitudinal tie rods M. Transverse travel of the bar L on carriage C is imparted to the trailer transverse bar K through bell crank arm D, longitudinal link J and bell crank arm I. In this manner, any direction of travel of the tracer T will cause a like direction of travel of the blowpipe supporting bar S.

In the embodiment shown in the drawing the track R comprises rails 10 and 12 on which the carriage C and trailer E roll on wheels within the wheel guards 14. The rails 10 and 12 are supported by a frame comprising legs 15, the forward portion of the frame forming a tracing table 16 on which is mounted the templet, pattern or drawing 18 to be traced by the tracer T.

On the carriage C the arms A and B are of equal length, and are respectively pivoted on pivot pins 20 and 22 rigidly mounted in upstanding spaced relation on the top of the rear of the carriage. From these pivots the arms A and B extend forward and their front ends are pivoted on pins 24 and 26 rigidly secured to the transverse bar L in upstanding relation and spaced apart the same distance as the pins 20 and 22.

On the trailer E, the arms G and H are of equal length to the arms A and B, and are respectively pivoted on pivot pins 21 and 23 rigidly mounted in upstanding relation on top of the trailer E, and spaced apart the same distance as the pins 20 and 22. From these pins 21 and 23 the arms G and H extend forward and their front ends are pivoted on pins 25 and 27 rigidly secured to the transverse bar K in upstanding relation and spaced apart the same distance as pins 24 and 26.

The bell crank arms D and I are equal in length to each other, and are pivoted to the longitudinal link J by knuckles 28 and 30. The longitudinal link J and the carriage tie rods M are equal in length, and equally adjustable in length for spacing the trailer E from the carriage C to suit the number of tools on the supporting bar S.

The transverse bars L and K have telescopic extensions 34 which are racked by handwheels 35 to adjust the outward extent of the supporting bar S. The tools or blowpipes 36 are mounted on the bar S by longitudinally adjustable brackets 38 and secured in position by screws 39. The blowpipes 36 can be individually racked in the brackets 38 by conventional means not shown.

The workpiece or steel plate 40 to be cut is supported by a suitable frame 42 at one side and parallel to the rails 10 and 12, and with the six blowpipes 36 shown, six equal shapes or products 45 can be cut at the same time from the same plate 40.

It should be noted that the package attachment for converting the conventional dual swinging arm machine may comprise two bell crank levers, one BD for the carriage and the other HI for the trailer. The plain arm of the conventional machine is removed from the pivot pin 26, on which the new bell crank lever BD is substituted. The plain arm thus removed is remounted on the pivot pin 21 on the trailer to become the plain arm G.

I claim:

1. For use with a reproducing machine having a carriage movable along a track, a pair of parallel swinging arms pivoted on said carriage, a transverse bar pivotally connecting said arms, and a tracer on said bar; an attachment for supporting a longitudinal row of reproducing tools comprising a bell crank arm rigid with one of said parallel arms, a trailer connected to said carriage and movable along said track and having corresponding parallel swinging arms and bell crank arm, a longitudinal link pivotally connecting said bell cranks, a transverse bar pivotally connecting said trailer arms, and a longitudinal tool supporting bar mounted on corresponding end portions of said transverse bars.

2. For use with a reproducing machine having a carriage movable along a track, a pair of parallel swinging arms pivoted on said carriage, a transverse bar pivotally connecting said arms, and a tracer on said bar; an attachment for supporting a longitudinal row of reproducing tools comprising an arm with a rigidly extending bell crank lever adapted to be substituted for one of said parallel arms, a trailer movable along said track and having a corresponding arm with rigidly extending bell crank lever and a pivot adapted to receive the substituted parallel arm from the carriage, means for connecting said trailer to said carriage, a longitudinal link for connecting said bell crank levers, a transverse bar connecting said trailer or substituted arm and the arm thereon having the bell crank lever, and a longitudinal tool supporting bar mounted on corresponding end portions of said transverse bars.

References Cited in the file of this patent

UNITED STATES PATENTS

| | | |
|---|---|---|
| 1,807,989 | Krebs | June 2, 1931 |
| 2,477,108 | Young | July 26, 1949 |
| 2,571,196 | Bucknam | Oct. 16, 1951 |
| 2,571,248 | Hutt | Oct. 16, 1951 |
| 2,622,328 | Krohn | Dec. 23, 1952 |